United States Patent
Nam et al.

[11] Patent Number: 6,029,112
[45] Date of Patent: Feb. 22, 2000

[54] POSTAL ROUTE SYSTEM AND METHOD FOR FAST ALGORITHM OF THE SHORTEST PATH IN THE SAME

[75] Inventors: Sang Woo Nam; Dong Chin Woo, both of Taejon-shi, Rep. of Korea

[73] Assignee: Electronics and Telecommunications Research Institute, Taejon-shi, Rep. of Korea

[21] Appl. No.: 08/804,269

[22] Filed: Feb. 21, 1997

[30] Foreign Application Priority Data

Jun. 12, 1996 [KR] Rep. of Korea ............ 96-20996

[51] Int. Cl.[7] ............................................. G06F 165/00
[52] U.S. Cl. .................. 701/209; 701/202; 701/210; 701/208; 701/117; 701/200; 340/990; 340/995; 364/449; 364/444
[58] Field of Search .................. 701/209, 202, 701/210, 208, 117, 200; 340/990, 995; 364/449, 444

[56] References Cited

U.S. PATENT DOCUMENTS

| | | | |
|---|---|---|---|
| 4,937,753 | 6/1990 | Yamada | 701/209 |
| 5,506,779 | 4/1996 | Kanki | 701/209 |
| 5,638,280 | 6/1997 | Nishimura et al. | 701/209 |
| 5,657,231 | 8/1997 | Nobe et al. | 701/209 |
| 5,774,828 | 6/1998 | Brunts et al. | 701/210 |
| 5,845,227 | 12/1998 | Peterson | 701/209 |
| 5,902,349 | 5/1999 | Endo et al. | 701/202 |

OTHER PUBLICATIONS

Chris Palmer, "Dijkstra's Algorithm", Nov. 18, 1995, Shortest Paths: Dijkstra's Algorithm, pp. 1–5.
Mark Manasse, Greg Nelson, "An Animation of the k–Shortest Paths Algorithm", undated, Animation of the k–Shortest Paths Algorithm in Zeus, pp. 1–2.

*Primary Examiner*—William A. Cuchlinski, Jr.
*Assistant Examiner*—Olga Hernandez
*Attorney, Agent, or Firm*—Jacobson, Price, Holman & Stern PLLC

[57] ABSTRACT

This invention provides a method for searching the shortest path between two points in a geographics information system. In a postal route system and method for fast algorithm of the shortest path search with direction in the same according to the present invention, in order to serve an application service associated with the method for fast algorithm of the shortest path search, a map and an associated information are constituted by a database through which the process to generate the shortest path is performed so that it is possible to provide services utilized in such as postal delivery, transport information system and general road information guide which require the information on the shortest distance.

2 Claims, 3 Drawing Sheets

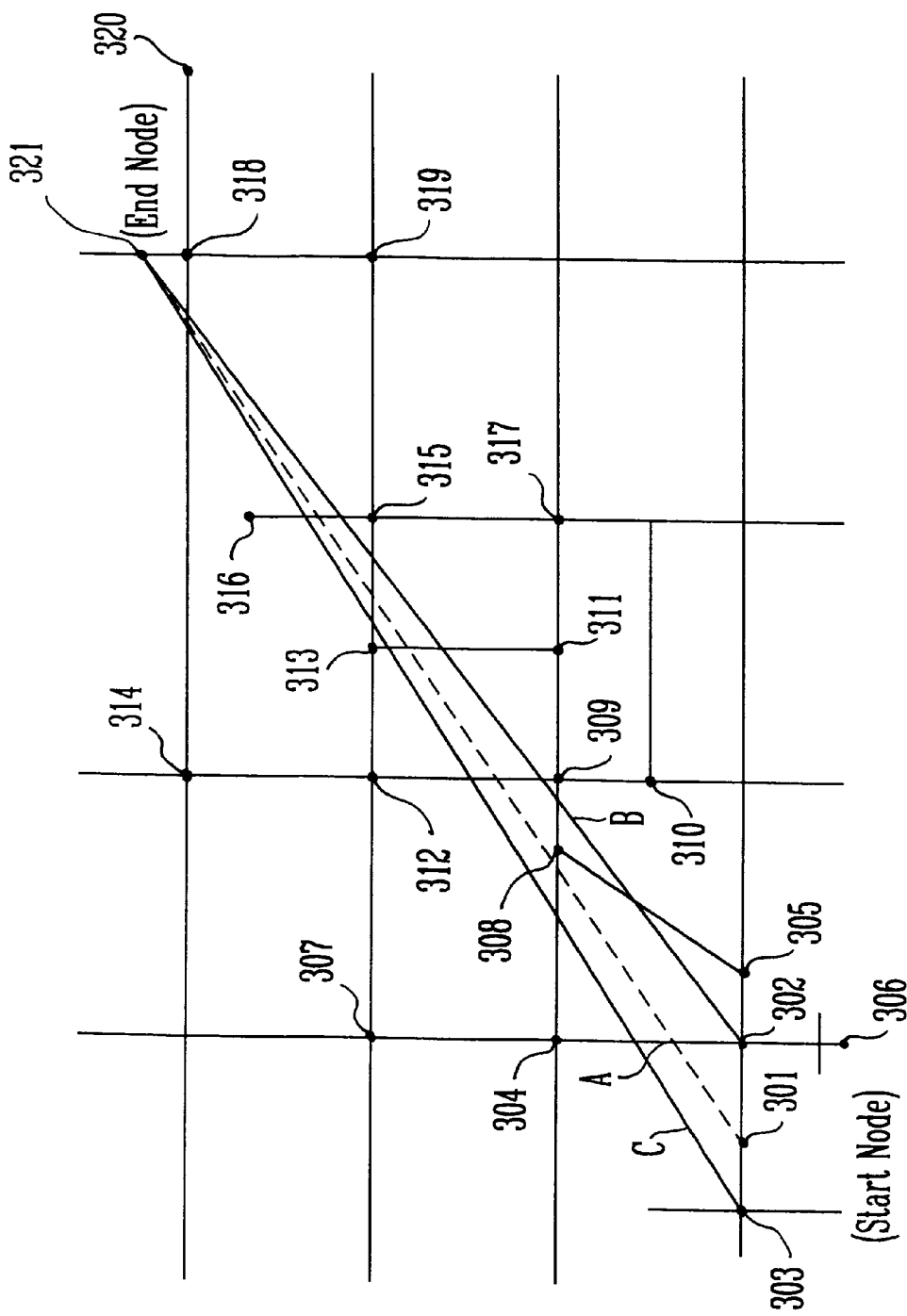

6,029,112

POSTAL ROUTE SYSTEM AND METHOD FOR FAST ALGORITHM OF THE SHORTEST PATH IN THE SAME

BACKGROUND OF THE INVENTION

1. Field of the Invention

This invention relates to a postal route system and a method for fast algorithm of the shortest path search in the same, and more particularly to a postal route system and method for searching for the shortest path which can be reached at the highest speed when one wants to move from any site to an destination site with a particular purpose after a geographical information and topographical information are established.

2. Description of the Prior Art

Typically, creation methods of the shortest path can be classified into two processes, one process for calculating and generating the shortest path regardless of a directionality and another process for calculating and generating the shortest pass in consideration of a directionality.

In the process regardless of a directionality of such a prior system, the information of the roads on the map is represented by such line as arc and then all of the road connected each other on the map is searched so that a distance is calculated for searching for a path, or the shortest path is calculated and generated by way of a distance calculation method which is applicable to all case for the roads within a certain range.

In the process described above, however, if the number of the road to be calculated is large because of the long distance and complicated path between a starting point and a destination point, since the number of the road to be calculated become increased by geometrical progression in the way of n!, time of the calculation in long and furthermore the calculation is likely to be impossible if the number of the road exceeds a certain number. Therefore, the system using this process has a problem in that the efficiency of the system is likely to reduce and an operator is not easy to utilize the system.

Accordingly, there is a need that the number of the calculation should be reduced to raise the efficiency of the postal route system. Recently, measurements in which the structure of the road is simplified or only the roads to be selected partially among the entire roads are extracted and calculated have been proposed. However, these measurements have a disadvantage in that various properties including a difference in the road width (for example, a main road or a slide road), a difference in the lane (for example, 8 lanes or 2 lanes), and a connection of the roads, etc., is difficult to be expressed clearly.

In view of the foregoing problems, it is therefore an object of the present invention to provide a postal route system and method for fast algorithm of the shortest path search in the same which give the shortest path search capability with a high speed and a high efficiency such that the roads located on the shortest path can be primarily selected and searched to improve the performance of the postal route system and time required for searching can be reduced by increasing a degree of complexity in the number of nodes (junction points between the roads) only by amount in proportion to the number of node on the shortest path.

SUMMARY OF THE INVENTION

In order to accomplish the object, according to an aspect of the present invention, a postal route system comprises spacial and information database which can use both a general database management system and a database management system served from a geographics information system, a geographics information system engine including the shortest path generation algorithm module for finding the shortest route of the postal route by performing the process on the map, a coordinates value extraction, and a distance value calculation from the spacial and information database; an application system and user interface for displaying on a screen a trace of the shortest path followed by the shortest path generation algorithm module of the geographics information system engine; a shortest path knowledge database for storing data for the trace of the shortest path obtained by the shortest path generation algorithm module and using the same; and a map, diagram and node database for simultaneously processing the topographics data and information data by spacial and information database.

According to another aspect of the present invention, a method for fast algorithm of the shortest path search in a postal route system comprises the steps of calculating coordinates of a starting point, coordinates of a destination point, and a straight line between the starting point and destination point; extracting a road connected by the shortest distance between the starting point and the destination point; selecting a connection node in the starting point selected at present; determining whether the current selected road is a node including an end node or not and calculating a value of straight distance between the current selected nodes and the destination point if it is determined that the current selected node is the node including the end node; determining whether nodes with a small comparison value of the selected nodes are selected or not, storing a value of straight distance into a linked list file arranged in an ascending order if nodes with the remaining large comparison value are selected, and selecting other nodes and other connection roads if nodes with the smallest comparison value are selected; and by analysising and checking the selected roads, selecting nodes and roads with a comparison value next to the smallest comparison value and then returning to the step of analysising and checking the selected roads, or selecting another node of a selected road if a normally selected road exists and then returning to the step of determining whether the end node is included in the road or not.

BRIEF DESCRIPTION OF THE DRAWINGS

The present invention will be more clearly understood from the description as set forth below, with reference to the accompanying drawings, wherein:

FIG. 3 is a map as an example for applying the method proposed in FIG. 2.

DETAILED DESCRIPTION OF THE PREFERRED EMBODIMENT

Hereinafter, the present invention will be described by way of examples with reference to the accompanying drawings.

Figure 1:
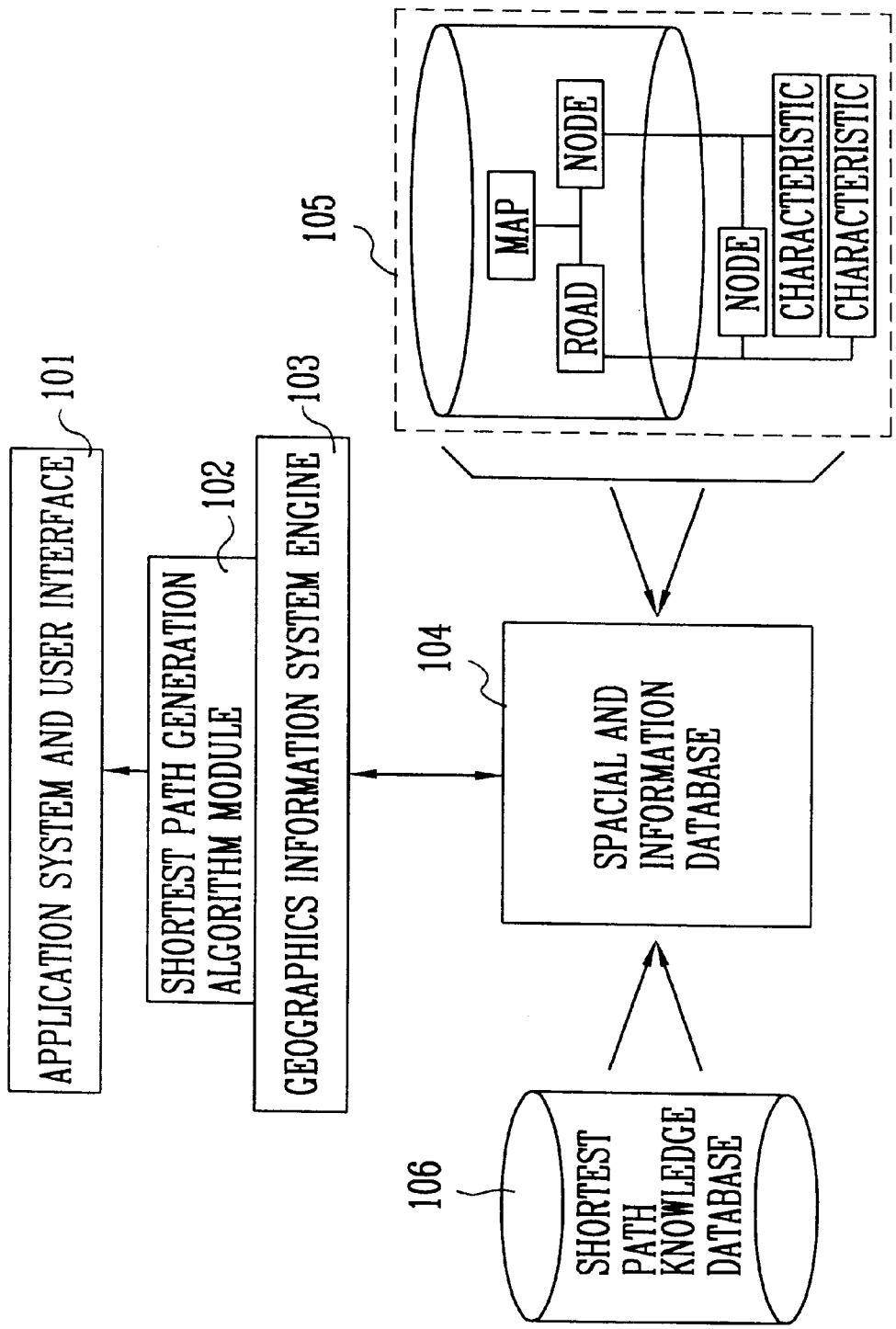
FIG. 1 is a configuration for illustrating a platform of a postal route system for generating a shortest path according to the present invention.

FIG. 1 shows a configuration for illustrating a platform of a postal route system for generating a shortest path according to the present invention. The postal route system of the present invention comprises a spacial and information database 104, the shortest path generation algorithm module 102 incorporating an algorithm for performing the process for a map, a coordinates value extraction, and a distance value calculation, a geogrphics information system (referred to "GIS" simply) engine 103 connected with the module 102, an user interface 101 related to an application system, a shortest path knowledge database 106, and a map, road and node database 105.

The spacial and information database 104 can use either a general database management system (referred to "DBMS" simply) or DBMS served from the geographics information system. Special (space) data processing and information data processing can be simultaneously performed. Taking an view of the construction of road item on the database, a node characteristics and a link content with a road to which the node belongs are contained in data item for mark and coordinates value of both end nodes connected to the road data and database for nodes as junction points of the roads. A map database is composed of a basis layer, a road layer linking roads with nodes, and other layers representing an associated information, including an address number layer.

Therefore, an user can express a starting point and a destination point as various parameters such as a location, an address number, a building name, and a road name on a map by means of the application system and the user interface 101.

When a region map of the postal route system is displayed on a screen, the user input the starting point and destination point by use of the user interact 101. These two points are indicated as points on the map. A road located near two points is read out from the road database by use of a coordinates function of the postal route system and this road is established as a reference road. The shortest path generation algorithm module 102 processes each node connected to these two points and connected roads and accumulates a degree of the shortest path generation to trace the shortest path. An result of the trace is displayed on a screen through the user interface of the application system.

Furthermore, in the system according to the present invention, when the shortest path expressed as names such as a building name and a road name is generated, since the generated shortest path is stored to the shortest path knowledge database 106 in order to be reused, the entire efficiency of the system can be improved.

Figure 2:
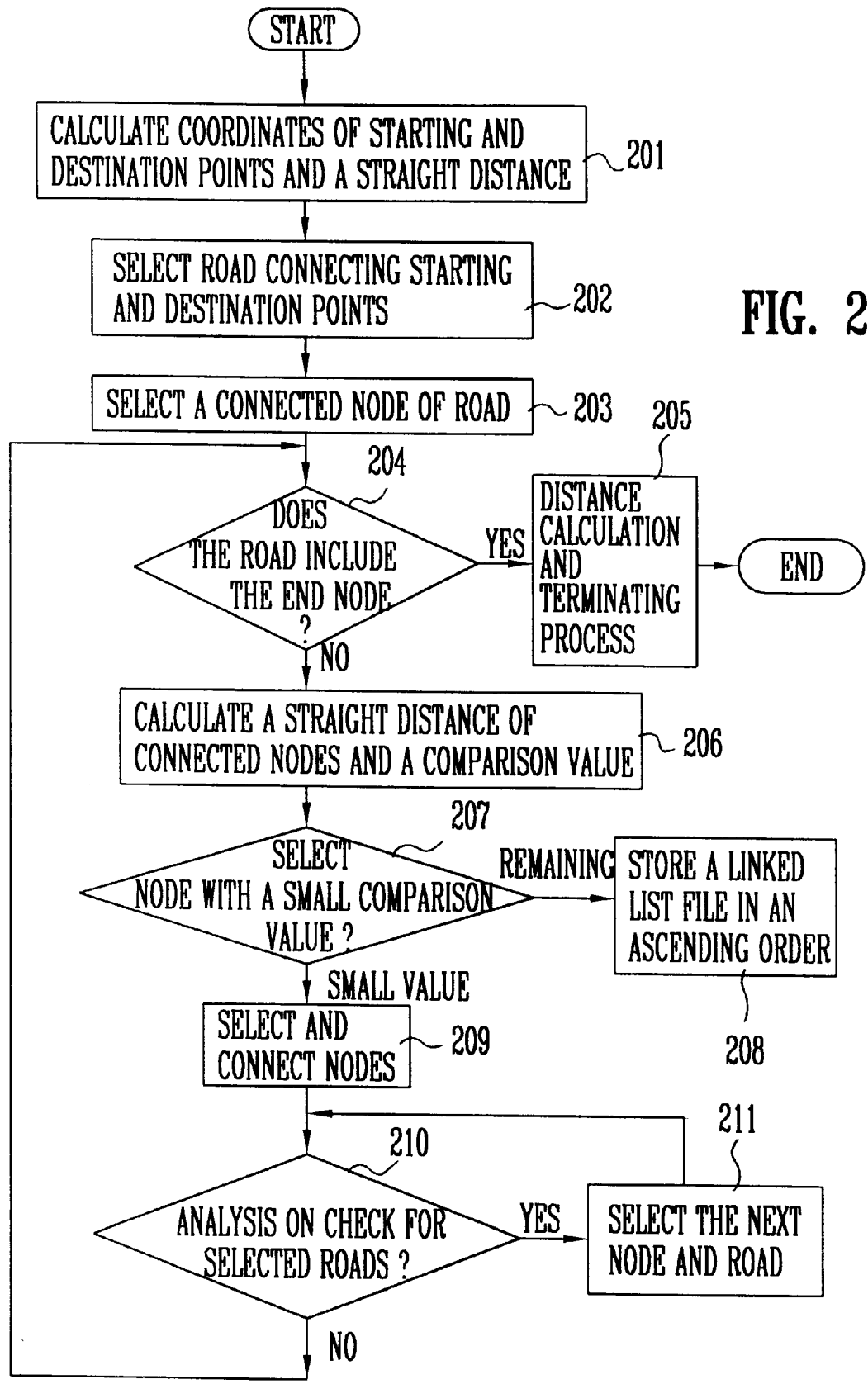
FIG. 2 is a flowchart for explaining a method for fast algorithm of the shortest path search by the postal route system.

FIG. 2 shows a flowchart for explaining a method for fast algorithm of the shortest path search by the postal route system. At start step 201, when an user designates locations of a starting point and a destination point through the user interface, the locations on the coordinates of a basis map are calculated and expressed by the engine of the postal route system. A method to select the starting point and the destination point includes a method to indicate a location on the map, a method to input an address, and a method to input information such as a building name or a road name, by using the function of the interface of the postal route system. As an example, the method to input an address allows a corresponding location to be indicated on the map through the map information of an address database. As another example, a user can designate easily both the starting point and the destination point on the map through the user interface by inputting a building or a road name, etc.

Subsequently at step 202, a road nearest to location of two points, the starting point and the destination point, designated at step 201 is selected and then proceeds to step 203.

Again, at step 202, when the nearest location on the road with the shortest distance, i.e., a straight distance, between the starting and destination points and the road is determined, two road to which the starting and destination points belong are generated. By use of a coordinates recognition function of the postal route system, a straight distance between the starting and destination points on the two roads is obtained, the straight distance being the shortest distance between the starting and destination points.

Then, at step 203, both end nodes connected to the road corresponding to the starting point designated at present are read out from the database and the procedure proceeds to step 204. At step 204, it is determined whether the road designated at present is a road including an end or not. If it is determined that the road designated at present is a road including an end node, the procedure proceeds to step 205.

At step 205, as the operation of the path selection has been already completed at step 204, the operation of the shortest path search is completed by a distance calculation and termination process.

Returning again to step 204, if it is determined that the road designated at present is not a road including an end node, the procedure proceeds to step 206. At step 206, a straight distance between the nodes designated at present and the location of the destination point is calculated and then the procedure proceeds to step 207. Furthermore, at this step 206, a comparison value is calculated by adding an accumulated value of the distance by this time, an initial value being established as "0", and a length of a current road. The comparison value is obtained by the following expression.

$$C_n = S + L + D_n$$

where S is a road length accumulated from the starting point to the current node, C is a length from the current node to a connected road to be compared, Dn is a distance from a connected node of the road to the destination point of the road as a target point. The number to be calculated and compared is the number of node to be selected.

Subsequently, at step 207, the comparison values of the selected nodes are checked and then the procedure proceeds to step 209 it the lowest comparison value of them is selected. On the other hands, if a remaining relatively large comparison value is selected, the procedure proceed to step 208. At step 208, the value of the straight distance is stored to a linked list file arranged in an ascending order. At step 209, the node with the selected lowest comparison value is selected as the nodes of the shortest path, and after other connected roads for the current selected node are searched and then selected in the database for the next processing, the procedure proceeds to step 210.

At step 210, the selected nodes are analysised and checked. Here, if other connected roads do not exist or they are connected to the nodes with only the previous selected roads, the procedure proceeds to step 211.

At step 211, the value of the straight distance is processed to select the next node corresponding to the smallest value in the linked list file and the road connected to the selected node are selected, and then the procedure returns to step 210 wherein the road to be connected normally on the shortest path is selected by performing again the analysis and check for the selected roads. If such a normally selected road exists, another node of the selected road is selected and then the procedure returns to step 204 wherein it is determined whether the road is a road including an end node or not. Thereafter, the procedures are repeated until a road with the destination point is selected by comparing and calculating successively the next nodes and roads in the way that the value of the straight distance between the selected node and the destination point is calculated. When the road with the destination point is selected, the shortest path is generated by connecting the so far selected roads each other and then the procedure is terminated.

FIG. 3 shows a map in which an example of the value of the straight distance proposed by the flowchart for explaining a method for fast algorithm of the shortest path search according to the present invention is shown.

The points from the starting point 301 to the destination point 321 are nodes to be checked and analysised for the shortest path generation. A is the straight distance between two points B and C are the straight distance between associated nodes. Here, if B is compared with C and then B is selected, a node 302 selected. In other words, the path from the node of the starting point 301 to the node 302 is the first candidate road selected as the shortest path.

Next, as described in step 209 in FIG. 2, the straight distance from nodes 304, 305 and 306 connected from node 302 by roads to the end node 321 of the destination point are calculated and the distance from the starting point node 301 to a node 302 and the distance from the node 302 to each node 303, 304 and 306 are added respectively to select the lowest distance value among the summed results. As a result, a node 305 is selected. The procedure continues in a similar manner. When a node 315 is reached, a node 319 is selected since a node 316 does not have a further connected road. In the same manner as described above, the shortest path to the end node 321 of the destination point is selected.

As explained above, according to the present invention, by realizing a method for extracting a shortest path and a method for fast algorithm of the shortest path search in an inventive postal route system, the search operation for the shortest path can be performed efficiently in a short time. Furthermore, the system of the present invention is effectively applicable to various applications such as information guide system and delivery system.

The postal route system constructed according to the present invention has an advantage in that the system is adapt to be used in moving services because information on the shortest path required to move toward a destination on account of a particular purpose (for example, postal delivery) can be provided in a short time by providing the shortest path by use of a method for fast algorithm of the shortest path search in the postal route system.

In addition, another advantage of the present invention is that the information on the shortest path is stored into database and the shortest path can be acquired by only the searching operation of the stored shortest path if one starts at the same location and reaches the same destination.

In addition, still another advantage of the present invention is that the system is adapt to extract the shortest path by way of a method for reducing the number of road to be calculated, and a fast path can also be generated by calculating a small number of road by way of a calculation method with an associated road in the center.

Furthermore, the present invention has an additional advantage in that the shortest distance can be generated by processing simply a path in case of complicated roads in urban region or a long distance in which the number of road to be calculated is large and services taking advantage of the system can be performed efficiently.

What is claimed is:

1. A postal route system comprising:

a spacial and information database which can use both a general database management system and a database management system served from a geographics information system;

a geographics information system engine including the shortest path generation algorithm module for finding the shortest route by performing the process on the map, a coordinates value extraction, and a distance value calculation from the spacial and information database;

an application system and user interface for displaying on a screen a trace of the shortest path followed by the shortest path generation algorithm module of the geographics information system; and a shortest path knowledge database for storing data for the trace of the shortest path obtained by the shortest path generation algorithm module and using the same, wherein a map, diagram and node database composed of a basis layer, a read layer linking roads with nodes, and other layers representing an associated information for simultaneously processing the spacial data and information data by the spacial and information database.

2. A method for fast algorithm of the shortest path search in a postal route system comprising the steps of:

calculating coordinates of a starting point, coordinates of a destination point, and a straight line between starting and destination points; extracting a road connected by the shortest distance between starting and destination points;

selecting a connection node in the starting point selected at present;

determining whether the current selected road is a node including an end node or not and calculating a value of straight distance between the current selected nodes and the destination point if it is determined that the current selected node is the node including the end node;

determining whether nodes with a small comparison value of the selected nodes are selected or not, storing a value of straight distance into a linked list file arranged in an ascending order if nodes with the remaining large comparison value are selected, and selecting other nodes and other connection roads if nodes with the smallest comparison value are selected; and by analysising and checking the selected roads, selecting nodes and roads with a comparison value next to the smallest comparison value and then returning to the step of analysising and checking the selected roads, or selecting another node of a selected road if a normally selected road exists and then returning to the step of determining whether the end node is included in the road or not.

* * * * *